United States Patent
Xu et al.

(10) Patent No.: US 8,782,082 B1
(45) Date of Patent: Jul. 15, 2014

(54) METHODS AND APPARATUS FOR MULTIPLE-KEYWORD MATCHING

(75) Inventors: Qiuer Xu, Nanjing (CN); Liwei Ren, Sunnyvale, CA (US)

(73) Assignee: Trend Micro Incorporated, Tokyo (JP)

(*) Notice: Subject to any disclaimer, the term of this patent is extended or adjusted under 35 U.S.C. 154(b) by 263 days.

(21) Appl. No.: 13/290,734

(22) Filed: Nov. 7, 2011

(51) Int. Cl.
*G06F 17/30* (2006.01)

(52) U.S. Cl.
USPC ............... 707/780; 707/758; 707/E17.039

(58) Field of Classification Search
None
See application file for complete search history.

(56) References Cited

U.S. PATENT DOCUMENTS

| | | | |
|---|---|---|---|
| 6,321,226 B1 | 11/2001 | Garber et al. | |
| 6,490,575 B1 | 12/2002 | Berstis | |
| 6,748,387 B2 | 6/2004 | Garber et al. | |
| 6,976,025 B2* | 12/2005 | Luk et al. ............... | 1/1 |
| 7,502,781 B2 | 3/2009 | Garber et al. | |
| 7,908,258 B2 | 3/2011 | Kudo et al. | |
| 7,996,369 B2* | 8/2011 | Li et al. ............ | 707/673 |
| 2002/0032680 A1 | 3/2002 | Garber et al. | |
| 2003/0140038 A1 | 7/2003 | Baker et al. | |
| 2003/0158725 A1* | 8/2003 | Woods ............ | 704/10 |
| 2004/0186722 A1 | 9/2004 | Garber et al. | |
| 2005/0044105 A1 | 2/2005 | Terrell | |
| 2007/0220052 A1 | 9/2007 | Kudo et al. | |
| 2011/0202559 A1 | 8/2011 | Stiers | |
| 2011/0231416 A1 | 9/2011 | Goodchild et al. | |
| 2012/0011150 A1 | 1/2012 | Swaminathan et al. | |

OTHER PUBLICATIONS

Manber, U. and G. Myers "Suffix Arrays: A New Method for On-Line Searches", Proceedings of the 1st Annual ACM-SIAM Symposium on Discrete Algorithms, 1990, pp. 319-327.*

* cited by examiner

*Primary Examiner* — Anteneh Girma
(74) *Attorney, Agent, or Firm* — Okamoto & Benedicto LLP

(57) ABSTRACT

One embodiment relates to a computer-implemented method for multiple-keyword matching performed using a computer including at least a processor, data storage, and computer-readable instructions. A keyword set and a text input to be searched are obtained. The keyword set is processed to create a reverse trie. A search procedure which starts from the end of the text is then applied using the reverse trie to find keyword occurrences in the text input. Other embodiments, aspects, and features are also disclosed.

4 Claims, 9 Drawing Sheets

METHODS AND APPARATUS FOR MULTIPLE-KEYWORD MATCHING

BACKGROUND OF THE INVENTION

1. Field of the Invention

The present invention relates generally to methods and apparatus for keyword matching. The technology disclosed herein may be applicable in various fields, including data leakage prevention, spam filtering, search engines, anti-plagiarism, data de-duplication, and other text processing applications.

2. Description of the Background Art

Keyword searching is an important technology in various fields that utilize text processing. Such fields include, for example, data leakage prevention, spam filtering, search engines, anti-plagiarism, data de-duplication, and other text processing applications.

It is highly desirable to improve the efficiency and accuracy of keyword searching technologies.

SUMMARY

One embodiment relates to a computer-implemented method for multiple-keyword matching performed using a computer including at least a processor, data storage, and computer-readable instructions. A keyword set and a text string to be searched are obtained. The keyword set is processed to create a reverse-trie structure. A search procedure which starts from the end of the text is then applied using the reverse trie to find keyword occurrences in the text input.

Another embodiment relates to a computer apparatus configured to perform multiple-keyword matching. The apparatus includes data storage configured to store computer-readable instruction code and data, and a processor configured to access the data storage and to execute said computer-readable instruction code. Computer-readable instruction code is configured to process the keyword set to create a reverse-trie structure and to apply a reverse search procedure using the reverse-trie structure to find keyword matches in the text string.

These and other embodiments and features of the present invention will be readily apparent to persons of ordinary skill in the art upon reading the entirety of this disclosure, which includes the accompanying drawings and claims.

DETAILED DESCRIPTION

Problem Addressed by the Present Disclosure

Keyword searching is an important technology in various fields that utilize text processing. Such fields include, for example, data leakage prevention, spam filtering, search engines, anti-plagiarism, data de-duplication, and other text processing applications. In these fields, it is sometimes desired to search a text file to check for the presence of multiple keywords. Multiple-keyword matching is a substantially more challenging task than single-keyword matching.

For example, multiple-keyword matching may require matching a text file against a very large dictionary of keywords. The size of the dictionary may be, for example, of the scale of thousands or millions of keywords. Performing this keyword matching with a large dictionary in a reasonable amount of time is a very challenging task, even with the processing speed of today's computer systems.

Difficulties and Disadvantages of Previous Solutions

One previous solution for multiple-keyword matching uses a Boyer-Moore-Horspool (BMH) procedure iteratively. The BMH procedure is an efficient procedure for single-keyword matching. However, applicants believe that the BMH algorithm scales poorly to matching multiple keywords.

Another previous solution for multiple-keyword matching is to extend a Karp-Rabin (KR) procedure to matching multiple keywords. KR was originally designed for single-keyword matching and uses a hash function to match keywords in a given text. However, applicants believe that the KR procedure also scales poorly to matching multiple keywords when at least one of the keywords is relatively short (for example, less than 5 bytes long).

Keyword Match Procedure

The present application discloses a novel and innovative procedure which successfully finds multiple keywords, including both long and short keywords, in a given text document in a highly scalable manner. The following is a statement of the problem solved by the keyword matching procedure. It is a general problem to search a given text file to match multiple keywords. Assume that we have a keyword dictionary (set of keywords to be matched) KW having M keywords $KW_1$ to $KW_M$, i.e. $KW=\{KW_1, KW_2, KW_M\}$, where the keywords are identified by the keyword identifiers KID=$\{1, 2, \ldots, M\}$. Further assume that we are given a text string T having the N characters $t_1, t_2, \ldots, t_N$ in series, i.e. $T=t_1 t_2 \ldots t_N$. The problem is to find and locate all occurrences of keywords from the dictionary KW in the text string T.

Note that, without loss of generality, it may be assumed that all the keywords K are case sensitive. For keywords with case insensitivity, a similar procedure may be constructed.

Figure 1:
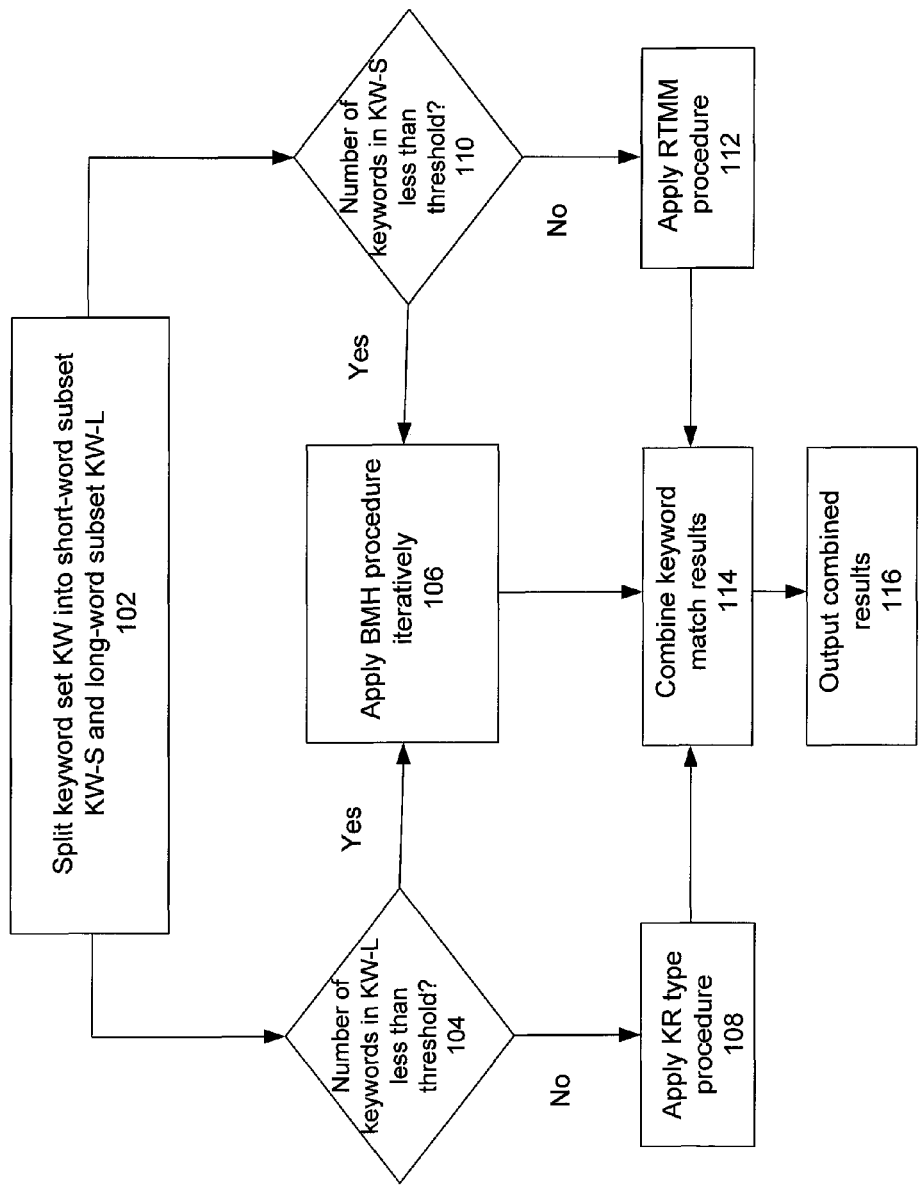
FIG. 1 is a high-level flow chart of a computer-implemented method for multiple-keyword matching in accordance with an embodiment of the invention.

FIG. 1 is a high-level flow chart of the multiple keyword matching procedure 100 in accordance with an embodiment of the invention. As shown in step 102, the keyword dictionary (set of keywords) KW may be divided or split into multiple subsets.

In one embodiment, the keyword dictionary KW may be divided into two non-overlapping subsets of keywords. The two subsets may be KW-L for longer keywords, and KW-S for shorter keywords. For example, KW-L may include only those keywords whose length is longer than or equal to a threshold length L (in characters), and KW-S may include only those keywords which are shorter than length L. For example, the threshold length L may be ten characters or less. In one specific implementation, the threshold length L may be five characters.

Per step 104, a determination may be made as to whether the number of keywords in KW-L is less than a threshold size. The threshold size may be denoted as G. If the number of keywords in KW-L is less than G, then a Boyer-Moore-Horspool (BMH) procedure may be applied iteratively (i.e. once for each keyword in KW-L) per step 106. Otherwise, if the number of keywords in KW-L is greater than or equal to G, then a Karp-Rabin (KR) type procedure may be applied per step 108.

Per step 110, a determination may be made as to whether the number of keywords in KW-S is less than a threshold size. The threshold size may be denoted as G. If the number of keywords in KW-S is less than G, then a BMH procedure may be applied iteratively (i.e. once for each keyword in KW-S) per step 106. Otherwise, if the number of keywords in KW-S is greater than or equal to G, then a Reverse-Trie based Multiple-short-keyword Matching (RTMM) procedure may be applied per step 112. The RTMM procedure is an innovative procedure which is disclosed in the present patent application. An embodiment of the RTMM procedure is described in detail below in relation to FIGS. 2 through 5 and Tables 1 through 3.

Per step 114, the keyword match results for KW-L and KW-S may be combined, and the combined results may be output per step 116.

In one particularly advantageous use, the short keyword dictionary KW-S may include a large number of pre-defined short names, including Chinese names, for example. The short names may be three-bytes UTF-8 characters long, for example.

Reverse-Trie based Multi-short-keyword Match (RTMM)

Figure 2:
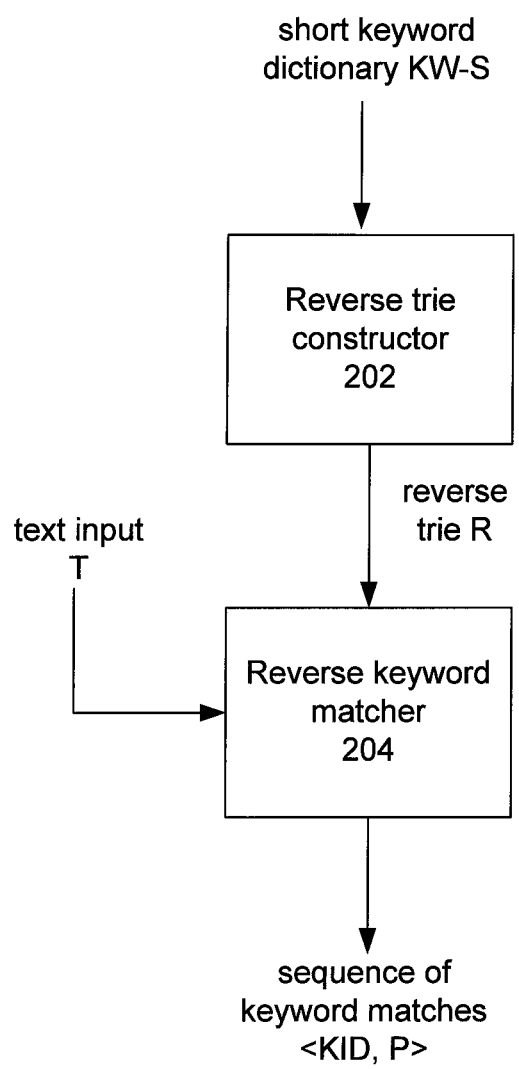
FIG. 2 is a block diagram of a computer-implemented apparatus configured to perform a Reverse-Trie based Multiple-short-keyword Matching (RTMM) procedure in accordance with an embodiment of the invention.

As mentioned above, an innovative technique, which is herein referred to as the Reverse-Trie based Multiple-short-keyword Matching (RTMM), may be utilized advantageously for matching multiple short keywords in a document. FIG. 2 is a block diagram of a computer-implemented apparatus 200 configured to perform the RTMM procedure in accordance with an embodiment of the invention. As shown, the computer-implemented apparatus 200 may include two main modules: a reverse trie constructor 202 and a reverse keyword matcher 204.

The reverse trie constructor 202 may receive the short keyword set (or short keyword dictionary) KW-S and processes it into a trie which is structured in reverse from the tail end of every keyword. This trie is called herein a "reverse trie" as it goes progresses in a reverse order from the last character of every keyword. The reverse trie may be denoted by R.

The reverse keyword matcher 204 may receive the reverse trie R from the constructor 202. The matcher 204 also receives a text input T to be matched against the keywords represented by the reverse trie R. The matcher 204 may be configured to output a sequence of keyword matches, if any. Each keyword match may be represented by a data pair <KID, P> including a keyword identifier (KID) and a position (P) in the text input.

Forming the Reverse Trie

Figure 3:
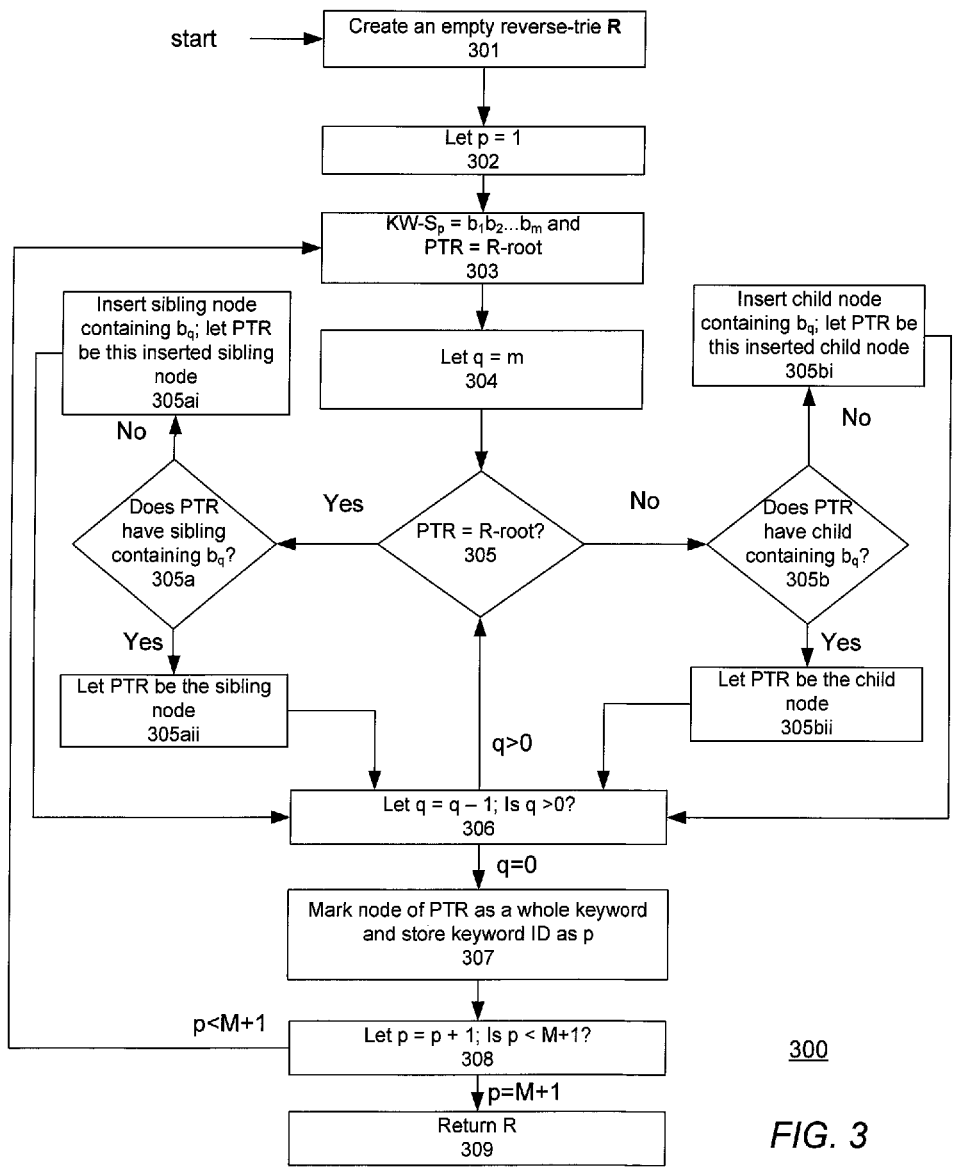
FIG. 3 is a flow chart of a method of constructing a reverse trie in accordance with an embodiment of the invention.

A procedure 300 for the formation of a reverse trie by the reverse trie constructor 202 is depicted in the flow chart of FIG. 3 and described below by the pseudo-code in Table 1. The steps 301 through 309 in the flow chart of FIG. 3 correspond to the steps 301 through 309 in the procedure of Table 1.

TABLE 1

Input:
Keyword dictionary KW-S = {KW-S$_1$, KW-S$_2$, ..., KW-S$_M$}
Output:
The reverse-trie R
Procedure 300:
301. Create an empty reverse trie R
302. Let p = 1
303. Present KW-S$_p$ as b$_1$ b$_2$ ... b$_m$ and PTR = R-root
304. Let q = m,
305. Determine whether or not PTR = R-root and handle the following cases:
    a. PTR = R-root
        i. If PTR has no sibling node (a sibling node is a node which branches from the present node and is on the same horizontal level) containing b$_q$, insert a sibling node containing b$_q$, let PTR be this inserted sibling node.
        ii. If PTR has a sibling node containing b$_q$, let PTR be this sibling node.
    b. PTR != R-root
        i. If PTR has no child node (a child node is a node that branches from the present node and is one horizontal level lower) containing b$_q$, insert a child node containing b$_q$, and let PTR be this inserted child node.
        ii. If PTR has a child containing b$_q$, let PTR be this child node.
306. Let q = q − 1, if q > 0, go to step 305
307. Mark the node of PTR as a whole keyword and store the keyword identifier (KID) as p.
308. Let p = p + 1, If p < M + 1, go to step 303
309. Return R Using the procedure 300 of FIG. 3 and Table 1, the construction or formation of a reverse trie for a simple example keyword set is now described in relation to FIGS. 4A through 4M. The simple example keyword set is KW-S={abc, abcd, dcd}, and M=3 since there are three keywords in KW-S. Note that a more practical real-world example may have many thousands of short keywords.

Per step 301, an empty reverse trie R is created. Per step 302, the counter p is set to 1.

Figure 4A:
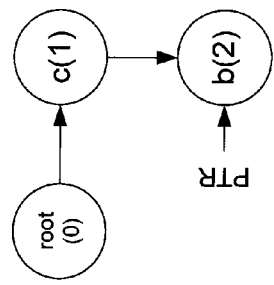
FIGS. 4A through 4M depict the construction of an example reverse trie for a simple hypothetical set of short keywords in accordance with an embodiment of the invention.

Per step 303, the first keyword ("abc") is presented as b$_1$b$_2$ ... b$_m$ (so that m=3, b$_1$="a", b$_2$="b", and b$_3$="c") and the pointer (PTR) is set to point to R-root. R-root is the root node of R. The empty reverse trie R with PTR pointing to the root node, denoted as node (0), is depicted in FIG. 4A.

Per step 304, the counter q is set to m. Since m=3, q is set to 3. Per step 305, a determination is made as to whether PTR is pointing to R-root. At this point in the procedure, PTR is pointing to R-root. Hence, the procedure 300 performs step 305a.

Figure 4B:
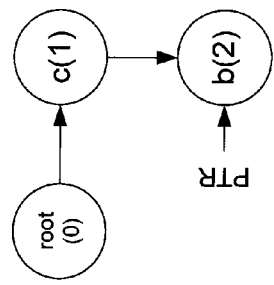

Per step 305a, a determination is made as to whether the node pointed to by PTR has a sibling node containing b$_q$=b$_3$="c". A sibling node is a node that branches from the node in question and is on the same horizontal level as the node in question. In this case, since R is empty, there is no such sibling node. Hence, the procedure 300 goes on to perform step 305ai. Per step 305ai, a sibling node containing b$_3$="c" is inserted into R as node (1), and PTR is changed to point to this inserted sibling node. FIG. 4B shows R at this stage in the construction process.

Subsequently, per step 306, q is decremented by 1 such that q is now set to 2, and a determination is made as to whether q is greater than 0. Since q=2>0, the procedure 300 loops back to step 305. Per step 305, a determination is made as to whether PTR is pointing to R-root. At this point in the procedure, PTR points to node (1) which is not the root node. Hence, the procedure 300 performs step 305b.

Figure 4C:
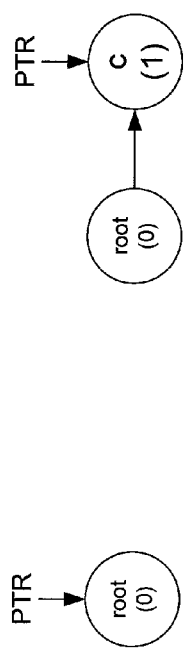

Per step 305b, a determination is made as to whether the node pointed to by PTR has a child node containing b$_q$=b$_2$="b". A child node is a node that branches from the node in question and one horizontal layer lower than the node in question. In this case, as seen in FIG. 4B, there is no such child node. Hence, the procedure 300 goes on to perform step 305bi. Per step 305bi, a child node containing $b_2$="b" is inserted into R as node (2), and PTR is changed to point to this inserted child node. FIG. 4C shows R at this stage in the construction process.

Subsequently, per step 306, q is decremented by 1 such that q is now set to 1, and a determination is made as to whether q is greater than 0. Since q=1>0, the procedure loops back to step 305. Per step 305, a determination is made as to whether PTR is pointing to R-root. At this point in the procedure, PTR points to node (2) which is not the root node. Hence, the procedure 300 performs step 305b.

Per step 305b, a determination is made as to whether the node pointed to by PTR has a child node containing $b_q$=$b_1$="a". In this case, as seen in FIG. 4C, there is no such child node. Hence, the procedure 300 goes on to perform step 305bi. Per step 305bi, a child node containing $b_1$="a" is inserted into R as node (3), and PTR is changed to point to this inserted child node.

Figure 4D:
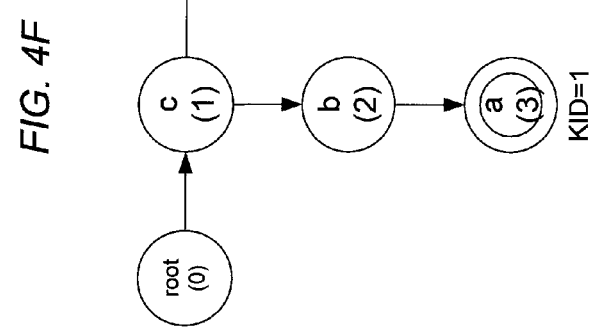

Subsequently, per step 306, q is decremented by 1 such that q is now set to 0, and a determination is made as to whether q is greater than 0. Since q=0 is not greater than 0, the procedure goes to step 307. Per step 307, the node pointed at by PTR is marked as a whole keyword. Hence, node (3) is marked as a whole keyword, and p=1 is stored as the keyword id, i.e. KID=1 for node (3). FIG. 4D shows R at this stage in the construction process, where the marking of node (3) as a whole keyword is indicated by the two concentric circles representing that node.

Per step 308, the procedure 300 may then increment p by 1 such that p=2, and a determination is made as to whether p<M+1=4. In this case, p=2<4, so the procedure 300 loops back to perform step 303.

Figure 4E:
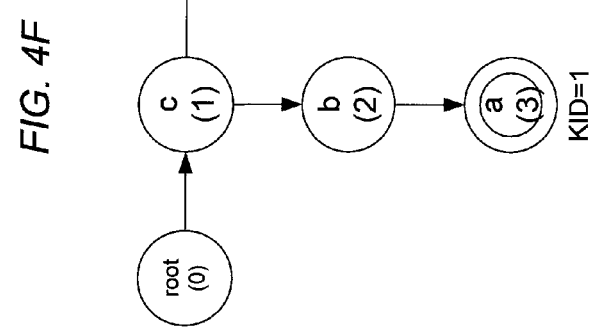

Per step 303, the second keyword ("abcd") is presented as $b_1 b_2 \ldots b_m$ (so that m=4, $b_1$="a", $b_2$="b", $b_3$="c", and $b_4$="d") and the pointer (PTR) is set to point to R-root. R-root is the root node of R. FIG. 4E shows R at this stage in the construction process.

Per step 304, q is set to m. Since m=4, q is set to 4. Per step 305, a determination is made as to whether PTR is pointing to R-root. At this point in the procedure, PTR is pointing to R-root. Hence, the procedure 300 performs step 305a.

Figure 4F:
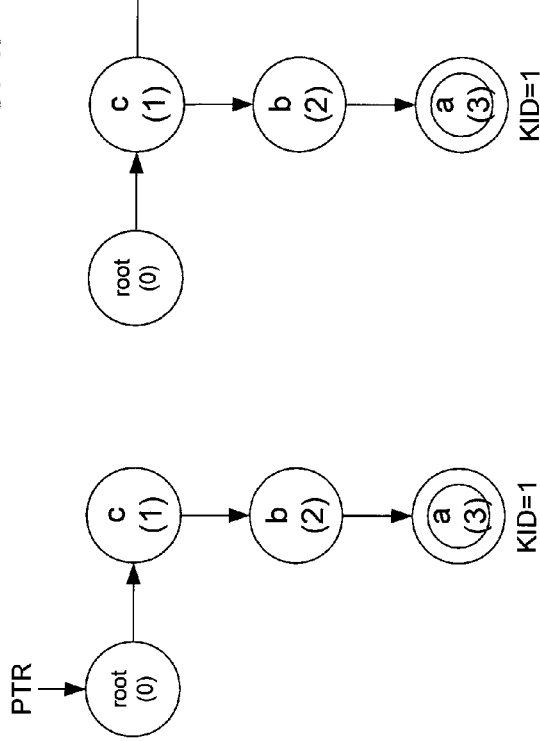

Per step 305a, a determination is made as to whether the node pointed to by PTR has a sibling node containing $b_q$=$b_4$="d". In this case, as seen in FIG. 4E, there is no such sibling node. Hence, the procedure 300 goes on to perform step 305ai. Per step 305ai, a sibling node containing $b_4$="d" is inserted into R as node (4), and PTR is changed to point to this inserted sibling node. FIG. 4F shows R at this stage in the construction process.

Subsequently, per step 306, q is decremented by 1 such that q is now set to 3, and a determination is made as to whether q is greater than 0. Since q=3>0, the procedure 300 loops back to step 305. Per step 305, a determination is made as to whether PTR is pointing to R-root. At this point in the procedure, PTR points to node (4) which is not the root node. Hence, the procedure 300 performs step 305b.

Figure 4I:
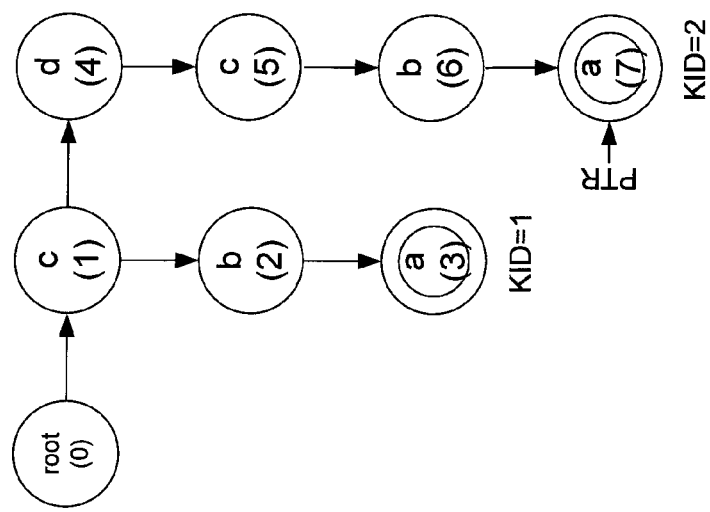
Figure 4H:
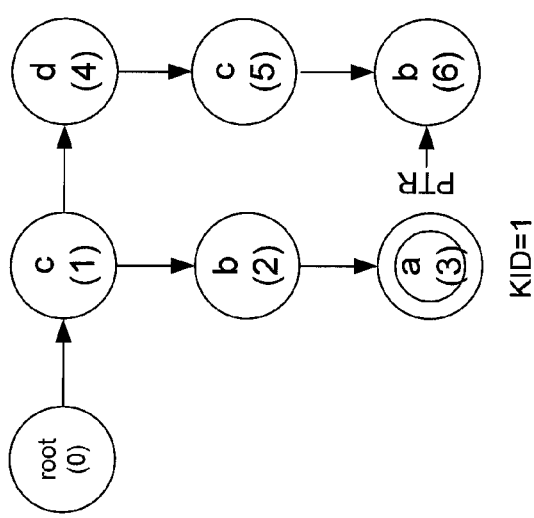
Figure 4G:
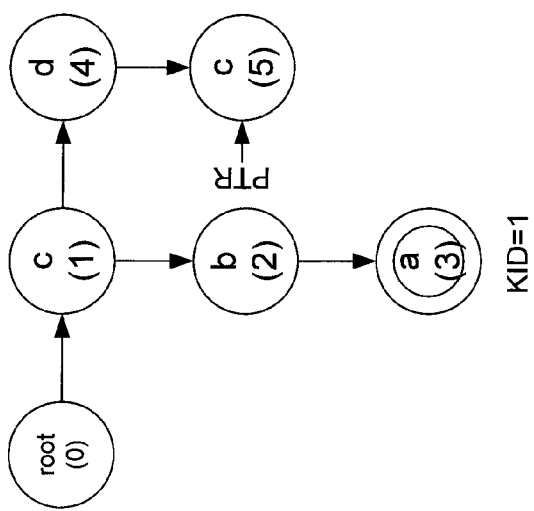

Per step 305b, a determination is made as to whether the node pointed to by PTR has a child node containing $b_q$=$b_3$="c". In this case, as seen in FIG. 4F, there is no such child node. Hence, the procedure 300 goes on to perform step 305bi. Per step 305bi, a child node containing $b_3$="c" is inserted into R as node (5), and PTR is changed to point to this inserted child node. FIG. 4G shows R at this stage in the construction process.

Subsequently, per step 306, q is decremented by 1 such that q is now set to 2, and a determination is made as to whether q is greater than 0. Since q=2>0, the procedure 300 loops back to step 305. Per step 305, a determination is made as to whether PTR is pointing to R-root. At this point in the procedure, PTR points to node (5) which is not the root node. Hence, the procedure 300 performs step 305b.

Per step 305b, a determination is made as to whether the node pointed to by PTR has a child node containing $b_q$=$b_2$="b". In this case, as seen in FIG. 4G, there is no such child node. Hence, the procedure 300 goes on to perform step 305bi. Per step 305bi, a child node containing $b_2$="b" is inserted into R as node (6), and PTR is changed to point to this inserted child node. FIG. 4H shows R at this stage in the construction process.

Subsequently, per step 306, q is decremented by 1 such that q is now set to 1, and a determination is made as to whether q is greater than 0. Since q=1>0, the procedure 300 loops back to step 305. Per step 305, a determination is made as to whether PTR is pointing to R-root. At this point in the procedure, PTR points to node (6) which is not the root node. Hence, the procedure 300 performs step 305b.

Per step 305b, a determination is made as to whether the node pointed to by PTR has a child node containing $b_q$=$b_1$="a". In this case, as seen in FIG. 4H, there is no such child node. Hence, the procedure 300 goes on to perform step 305bi. Per step 305bi, a child node containing $b_1$="a" is inserted into R as node (7), and PTR is changed to point to this inserted child node.

Subsequently, per step 306, q is decremented by 1 such that q is now set to 0, and a determination is made as to whether q is greater than 0. Since q=0 is not greater than 0, the procedure goes to step 307. Per step 307, the node pointed at by PTR is marked as a whole keyword. Hence, node (7) is marked as a whole keyword, and p=2 is stored as the keyword identifier, i.e. KID=2 for node (7). FIG. 4I shows R at this stage in the construction process, where the marking of node (7) as a whole keyword is indicated by the two concentric circles representing that node.

Per step 308, the procedure 300 may then increment p by 1 such that p=3, and a determination is made as to whether p<M+1=4. In this case, p=3<4, so the procedure 300 loops back to perform step 303.

Figure 4K:
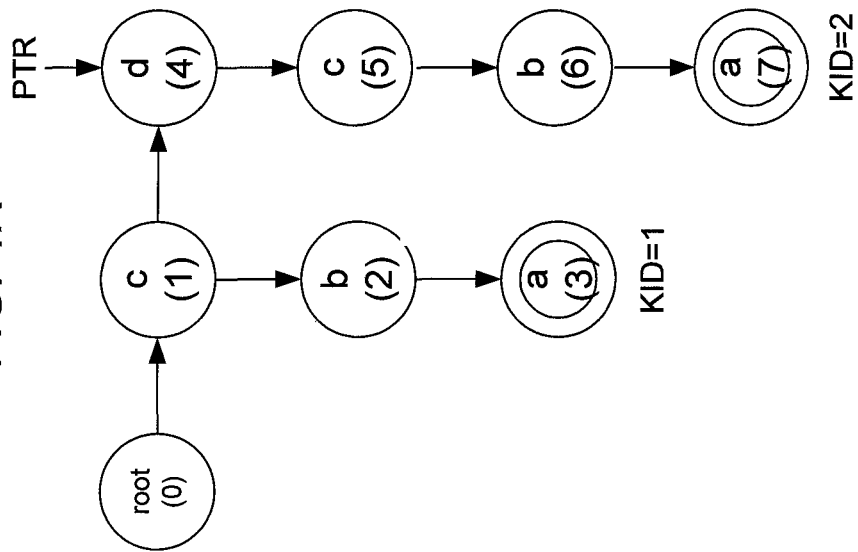
Figure 4J:
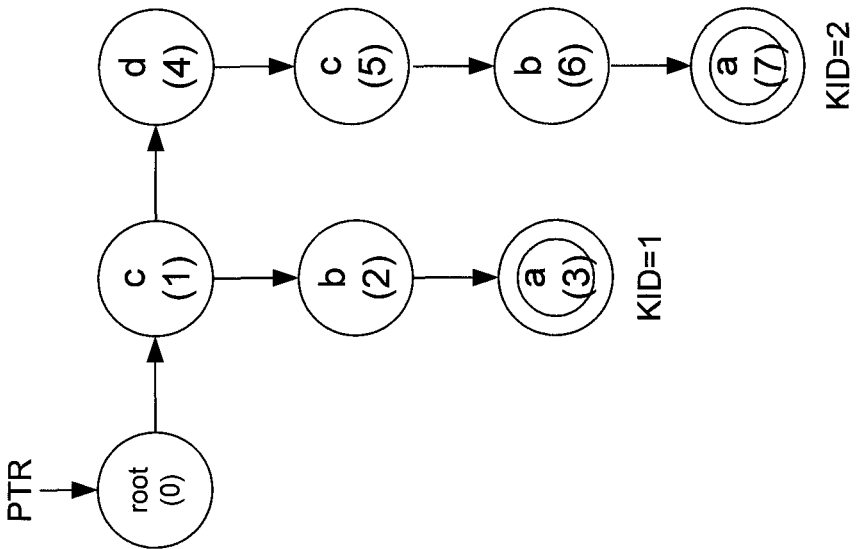

Per step 303, the third keyword ("dcd") is presented as $b_1 b_2 \ldots b_m$ (so that m=3, $b_1$="d", $b_2$="c", and $b_3$="d") and the pointer (PTR) is set to point to R-root. R-root is the root node of R. FIG. 4J shows R at this stage in the construction process.

Per step 304, q is set to m. Since m=3, q is set to 3. Per step 305, a determination is made as to whether PTR is pointing to R-root. At this point in the procedure, PTR is pointing to R-root. Hence, the procedure 300 performs step 305a.

Per step 305a, a determination is made as to whether the node pointed to by PTR has a sibling node containing $b_q$=$b_3$="d". In this case, as seen in FIG. 4J, there is such a sibling node, namely node (4). Hence, the procedure 300 goes on to perform step 305aii. Per step 305aii, PTR is changed to point to this sibling node. FIG. 4K shows R at this stage in the construction process.

Subsequently, per step 306, q is decremented by 1 such that q is now set to 2, and a determination is made as to whether q is greater than 0. Since q=2>0, the procedure 300 loops back to step 305. Per step 305, a determination is made as to whether PTR is pointing to R-root. At this point in the procedure, PTR points to node (4) which is not the root node. Hence, the procedure 300 performs step 305b.

Figure 4M:
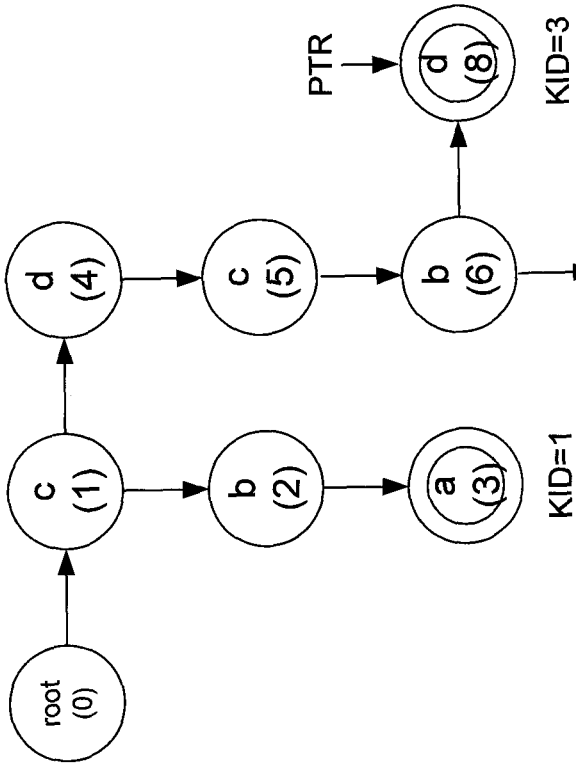
Figure 4L:
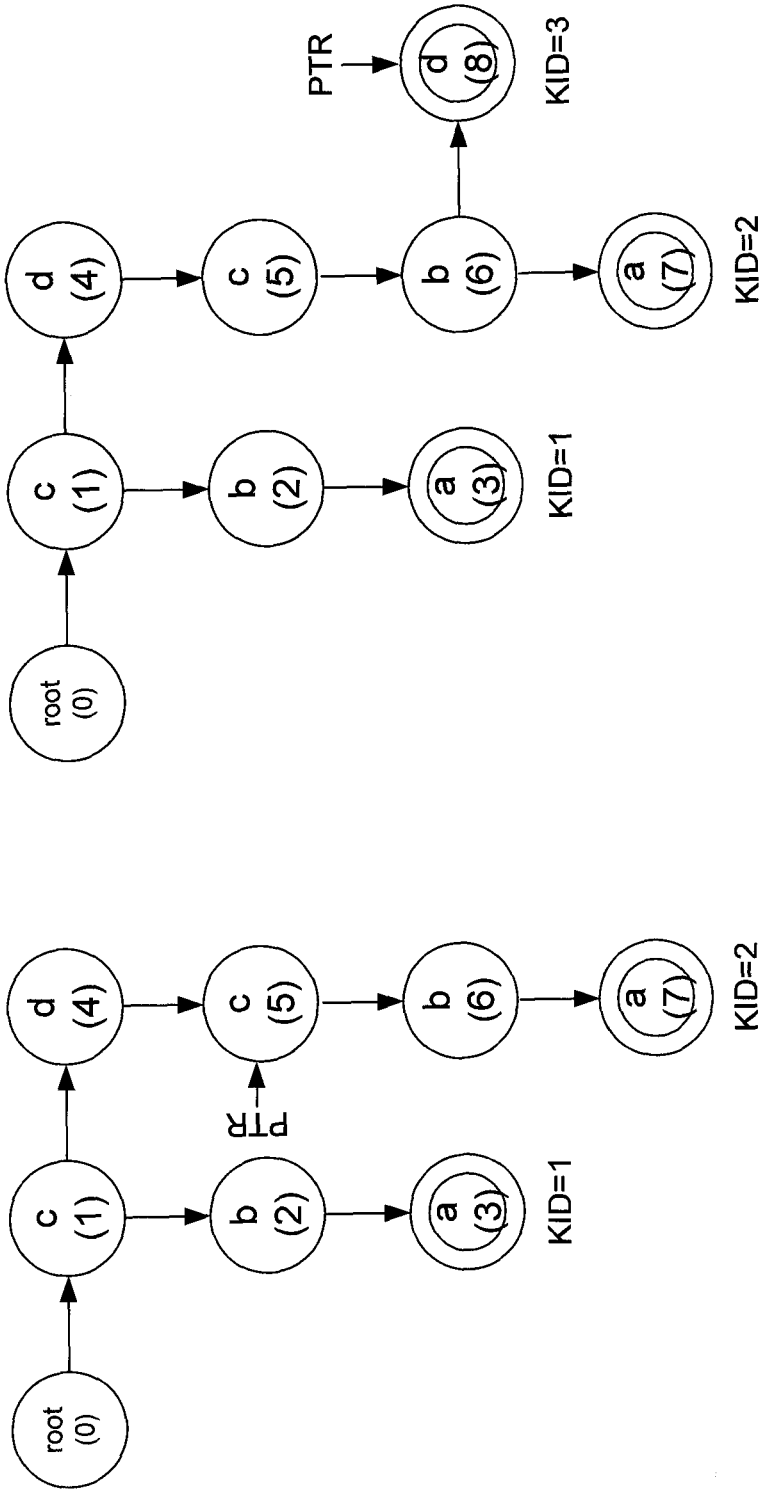

Per step 305b, a determination is made as to whether the node pointed to by PTR has a child node containing $b_q=b_2$="c". In this case, as seen in FIG. 4K, there is such a child node, namely node (5). Hence, the procedure 300 goes on to perform step 305bii. Per step 305bii, PTR is changed to point to this child node. FIG. 4L shows R at this stage in the construction process.

Subsequently, per step 306, q is decremented by 1 such that q is now set to 1, and a determination is made as to whether q is greater than 0. Since q=1>0, the procedure 300 loops back to step 305. Per step 305, a determination is made as to whether PTR is pointing to R-root. At this point in the procedure, PTR points to node (5) which is not the root node. Hence, the procedure 300 performs step 305b.

Per step 305b, a determination is made as to whether the node pointed to by PTR has a child node containing $b_q=b_1$="d". In this case, as seen in FIG. 4L, there is no such child node. Hence, the procedure 300 goes on to perform step 305bi. Per step 305bi, a child node containing $b_3$="d" is inserted into R as node (8), and PTR is changed to point to this inserted child node.

Subsequently, per step 306, q is decremented by 1 such that q is now set to 0, and a determination is made as to whether q is greater than 0. Since q=0 is not greater than 0, the procedure goes to step 307. Per step 307, the node pointed at by PTR is marked as a whole keyword. Hence, node (8) is marked as a whole keyword, and p=3 is stored as the keyword identifier, i.e. KID=3 for node (8). FIG. 4M shows R at this stage in the construction process, where the marking of node (8) as a whole keyword is indicated by the two concentric circles representing that node.

Per step 308, the procedure 300 may then increment p by 1 such that p=4, and a determination is made as to whether p<M+1=4. In this case, p is equal to (not less than) M+1, so the procedure 300 performs step 309 and returns R. Hence, the completed reverse trie R in this example is the R depicted in FIG. 4M.

Matching the Keywords in Reverse

A procedure 500 for the formation of a reverse trie by the reverse keyword matcher 204 is depicted in the flow chart of FIG. 5 and described below by the pseudo-code in Table 2. The steps 501 through 510 in the flow chart of FIG. 5 correspond to the steps 501 through 510 in the procedure of Table 2.

TABLE 2

Input:
Reverse trie R
Text T = $t_1t_2 \ldots t_N$
Empty list S.
Output:
K: number of keyword occurrences in T.
S: set of keyword occurrences. Each occurrence is represented by the keyword ID and its offset in T.
Procedure 500:
501. Create an array A [0 . . . (M − 1)] to store the status of matched nodes, where M = the maximum length of the keywords in the short keyword dictionary represented by R.
502. Let A[p] = R-root, where 0 ≤ p ≤ M − 1
503. Let q = N and K = 0
504. Let p = 0 and START = FALSE
505. If A[p] = R-root and START = FALSE
   a. If there exists a sibling node B such that $t_q$ is in B and B has a child node, let A[p] = child of B and START = TRUE
506. Else If START = FALSE and $t_q$ is in a node B which is either A[p] or its any sibling node
   a. If B is marked as a whole keyword, add keyword ID and q into S and let K = K + 1
   b. If B has a child node, let A[p] = child of B; Else let A[p] = R-root
507. Else let A[p] = R-root
508. Let p = p + 1, if p < M, go to step 505

TABLE 2-continued

509. Let q = q − 1, if q > 0, go to step 504
510. Return K and S

An example is now described of using the procedure of Table 2 for matching keywords in the hypothetical keyword set KW-S={abc, abcd, acd} to a simple example input text string T="bdcde". This keyword matching example is described in relation to Table 3. Note that a more practical real-world example may search for short keywords in input text strings that are millions of bytes long.

Figure 5:
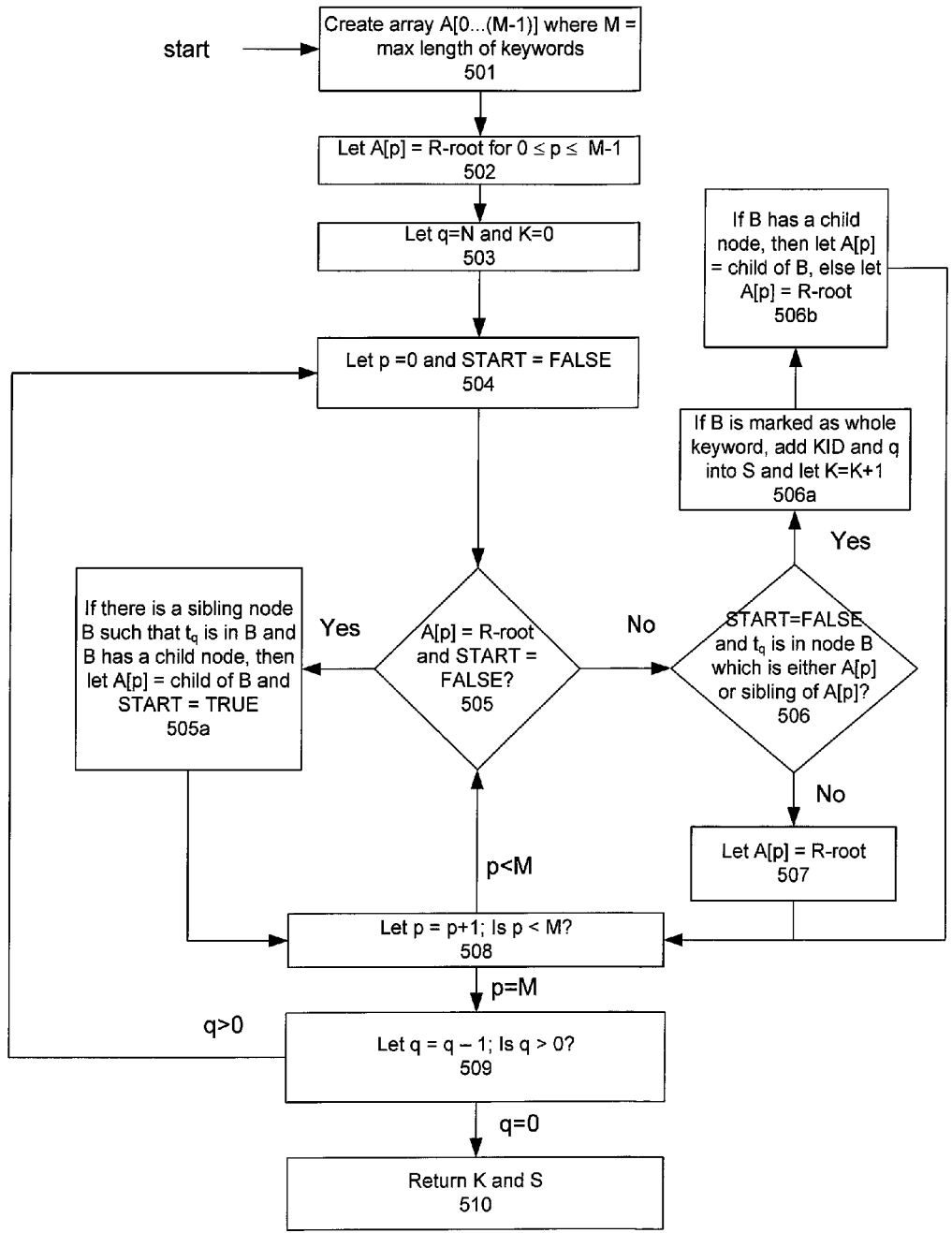
FIG. 5 is a flow chart of a method of reverse keyword matching in accordance with an embodiment of the invention.

Using the procedure 500 of FIG. 5 and Table 2, matching of keywords in the hypothetical keyword set KW-S={abc, abcd, dcd} is performed for a simple example input text string T="bdcde". This keyword matching example is described in relation to Table 3. In this case, the inputs of the procedure 500 include the reverse trie R which represents KW-S, the input text T=$t_1t_2 \ldots t_N$="bdcde", and the empty list S. In this example, the reverse trie R that represents KW-S is that shown in FIG. 4M. The outputs include the counter K which provides the number of keyword occurrences in T, and the set S of keyword occurrences. Each occurrence in S may be represented by a data pair including a keyword identifier (KID) and a position offset in T.

Per step 501, an array A[0 . . . (M−1)] may be created, where M is the maximum length of the keywords in KW-S. In this case, the maximum length of the keywords in KW-S is four, so M=4 and an array including elements A[0], A[1], A[2], and A[3] is created. Per step 502, each element of the array is set to R-root which is node (0) in R, so A[0]=A[1]=A[2]=A[3]=0 such that each array element (array pointer) points to the root node. Per step 503, the counter q is set to N, and the counter K is set to zero. N is the number of characters in T (i.e. the size of T in characters). In this simple example, N=5. K is a counter for the number of keyword matches that are found. Finally, per step 504, the array p is set to zero, and the START flag is set to FALSE.

At this point in the procedure 500, q=5, p=0, START=FALSE, A[0]=0, A[1]=0, A[2]=0, A[3]=0, S is empty, and K=0. This state corresponds to the state in row 1 of Table 3. Per step 505, a determination is made as to whether both the array element A[p] points to the root node of R (i.e. whether A[p] stores a value associated with R-root), and the START flag is FALSE. In this case, A[p]=A[0] does point to R-root, and START=FALSE. Hence, the procedure 500 performs step 505a. Per step 505a, a determination is made as to whether there exists a sibling node B to R-root such that $t_q$ is in B and B has a child node. In this case, q=6, so $t_q=t_5$="e". As seen in FIG. 4M, there is no sibling node of R-root that contains "e". Hence, the procedure 500 goes to step 508. Per step 508, the counter p is incremented by one so that p=1, and a determination is made as to whether p is less than M=4. In this case, p is less than M. As such, the procedure 500 loops back and performs step 505.

At this point in the procedure 500, q=5, p=1, START=FALSE, A[0]=0, A[1]=0, A[2]=0, A[3]=0, S is empty, and K=0. This state corresponds to the state in row 2. Because A[1]=0, START=FALSE, and $t_q=t_5$="e" is not in any sibling node of R-root, the procedure 500 goes through steps 505 and 505a in a similar manner as discussed above in relation to row 1. The procedure 500 then goes to step 508. Per step 508, the counter p is incremented by one so that p=2, and a determination is made as to whether p is less than M=4. In this case, p is less than M. As such, the procedure 500 loops back and performs step 505.

At this point in the procedure 500, q=5, p=2, START=FALSE, A[0]=0, A[1]=0, A[2]=0, A[3]=0, S is empty, and K=0. This state corresponds to the state in row 3. Because A[2]=0, START=FALSE, and $t_q=t_5=$"e" is not in any sibling node of R-root, the procedure 500 goes through steps 505 and 505a in a similar manner as discussed above in relation to row 1. The procedure 500 then goes to step 508. Per step 508, the counter p is incremented by one so that p=3, and a determination is made as to whether p is less than M=4. In this case, p is less than M. As such, the procedure 500 loops back and performs step 505.

At this point in the procedure 500, q=5, p=3, START=FALSE, A[0]=0, A[1]=0, A[2]=0, A[3]=0, S is empty, and K=0. This state corresponds to the state in row 4. Because A[3]=0, START=FALSE, and $t_q=t_5=$"e" is not in any sibling node of R-root, the procedure 500 goes through steps 505 and 505a in a similar manner as discussed above in relation to row 1. The procedure 500 then goes to step 508. Per step 508, the counter p is incremented by one so that p=4, and a determination is made as to whether p is less than M=4. In this case, p=M, so the procedure 500 goes to step 509. At step 509, the counter q is decremented by one such that q=4, and a determination is made as to whether q>0. In this case, q=4>0, so the procedure 500 loops back to step 504. At step 504, the counter p is reset to zero, and the START flag is reset to FALSE. The procedure 500 then goes to step 505.

At this point in the procedure 500, q=4, p=0, START=FALSE, A[0]=0, A[1]=0, A[2]=0, A[3]=0, S is empty, and K=0. This state corresponds to the initial state in row 5. Per step 505, a determination is made as to whether both the array element A[p] points to R-root, and the START flag is FALSE. In this case, A[p]=A[0] does point to R-root, and START=FALSE. Hence, the procedure 500 performs step 505a. Per step 505a, a determination is made as to whether there exists a sibling node B to R-root such that $t_q=t_4=$"d" is in B and B has a child node. As seen in FIG. 4M, node (4) is a sibling node of R-root that contains "d", and node (5) is a child node of node (4) Hence, the array element (array pointer) A[0] is set to 4 so as to point to the child node (5), and the START flag is set to TRUE. These changes in A[0] and START are shown in row 5. The procedure 500 then goes to step 508. Per step 508, the counter p is incremented by one so that p=1, and a determination is made as to whether p is less than M=4. In this case, p is less than M. As such, the procedure 500 loops back and performs step 505.

At this point in the procedure 500, q=4, p=1, START=TRUE, A[0]=5, A[1]=0, A[2]=0, A[3]=0, S is empty, and K=0. This state corresponds to the state in row 6. Per step 505, a determination is made as to whether both the array element A[p] points to R-root, and the START flag is FALSE. In this case, A[p]=A[1] does point to R-root, but START=TRUE. Hence, the procedure 500 performs step 506. Per step 506, a determination is made as to whether both START=FALSE, and $t_q$ is in a node B which is either A[1] or a sibling of A[1]. In this case, START=TRUE, so the procedure 500 performs step 507. Per step 507, the array element A[1] is set to zero so that it points to R-root. The procedure 500 then goes to step 508. Per step 508, the counter p is incremented by one so that p=2, and a determination is made as to whether p is less than M=4. In this case, p is less than M. As such, the procedure 500 loops back and performs step 505.

At this point in the procedure 500, q=4, p=2, START=TRUE, A[0]=5, A[1]=0, A[2]=0, A[3]=0, S is empty, and K=0. This state corresponds to the state in row 7. Because START=TRUE, the procedure 500 goes through steps 505, 506, and 507 in a similar manner as discussed above in relation to row 6. The procedure 500 then goes to step 508. Per step 508, the counter p is incremented by one so that p=3, and a determination is made as to whether p is less than M=4. In this case, p is less than M. As such, the procedure 500 loops back and performs step 505.

At this point in the procedure 500, q=4, p=3, START=TRUE, A[0]=5, A[1]=0, A[2]=0, A[3]=0, S is empty, and K=0. This state corresponds to the state in row 8. Because START=TRUE, the procedure 500 goes through steps 505, 506, and 507 in a similar manner as discussed above in relation to row 6. The procedure 500 then goes to step 508. Per step 508, the counter p is incremented by one so that p=4, and a determination is made as to whether p is less than M=4. In this case, p=M, so the procedure 500 goes to step 509. At step 509, the counter q is decremented by one such that q=3, and a determination is made as to whether q>0. In this case, q=3>0, so the procedure 500 loops back to step 504. At step 504, the counter p is reset to zero, and the START flag is reset to FALSE. The procedure 500 then goes to step 505.

At this point in the procedure 500, q=3, p=0, START=FALSE, A[0]=5, A[1]=0, A[2]=0, A[3]=0, S is empty, and K=0. This state corresponds to the initial state in row 9. Per step 505, a determination is made as to whether both the array element A[p] points to R-root, and the START flag is FALSE. In this case, A[p]=A[0] does not point to R-root. Hence, the procedure 500 performs step 506. Per step 506, a determination is made as to whether both START=FALSE, and $t_q$ is in a node B which is either A[0] or a sibling of A[0]. In this case, START=FALSE and $t_3=$"c" is in node (5) which is the node pointed to by A[0]=5, so the procedure 500 performs step 506a. Per step 506a, a determination is made as to whether node B is marked as a whole keyword. In this case, node B is node (5) which is not marked as a whole keyword, so the procedure 500 goes on to step 506b. Per step 506b, a determination is made as to whether node B has a child node. In this case, node (5) has a child node, namely node (6), for example. Hence, per step 506b, the array element A[0] is set to point to this child node, so the value in A[0] is changed from 5 to 6. This change is shown in row 9. The procedure 500 then goes to step 508. Per step 508, the counter p is incremented by one so that p=1, and a determination is made as to whether p is less than M=4. In this case, p is less than M. As such, the procedure 500 loops back and performs step 505.

At this point in the procedure 500, q=3, p=1, START=FALSE, A[0]=6, A[1]=0, A[2]=0, A[3]=0, S is empty, and K=0. This state corresponds to the initial state in row 10. Per step 505, a determination is made as to whether both the array element A[p] points to R-root, and the START flag is FALSE. In this case, A[p]=A[1] points to R-root, and START=FALSE. Hence, the procedure 500 performs step 505a. Per step 505a, a determination is made as to whether there exists a sibling node B to R-root such that $t_q=t_3=$"c" is in B and B has a child node. As seen in FIG. 4M, node (1) is a sibling node of R-root that contains "c", and node (2) is a child node of node (1). Hence, the array element A[1] is set to 2 so as to point to the child node (2), and the START flag is set to TRUE. These changes in A[1] and START are shown in row 10. The procedure 500 then goes to step 508. Per step 508, the counter p is incremented by one so that p=2, and a determination is made as to whether p is less than M=4. In this case, p is less than M. As such, the procedure 500 loops back and performs step 505.

At this point in the procedure 500, q=3, p=2, START=TRUE, A[0]=6, A[1]=2, A[2]=0, A[3]=0, S is empty, and K=0. This state corresponds to the state in row 11. Because START=TRUE, the procedure 500 goes through steps 505, 506, and 507 in a similar manner as discussed above in relation to row 6. The procedure 500 then goes to step 508. Per step 508, the counter p is incremented by one so that p=3, and a determination is made as to whether p is less than M=4. In this case, p is less than M. As such, the procedure 500 loops back and performs step 505.

At this point in the procedure 500, q=3, p=3, START=TRUE, A[0]=6, A[1]=2, A[2]=0, A[3]=0, S is empty, and K=0. This state corresponds to the state in row 12. Because START=TRUE, the procedure 500 goes through steps 505, 506, and 507 in a similar manner as discussed above in relation to row 6. The procedure 500 then goes to step 508. Per step 508, the counter p is incremented by one so that p=4, and a determination is made as to whether p is less than M=4. In this case, p=M, so the procedure 500 goes to step 509. At step 509, the counter q is decremented by one such that q=2, and a determination is made as to whether q>0. In this case, q=2>0, so the procedure 500 loops back to step 504. At step 504, the counter p is reset to zero, and the START flag is reset to FALSE. The procedure 500 then goes to step 505.

At this point in the procedure 500, q=2, p=0, START=FALSE, A[0]=6, A[1]=2, A[2]=0, A[3]=0, S is empty, and K=0. This state corresponds to the initial state in row 13. Per step 505, a determination is made as to whether both the array element A[p] points to R-root, and the START flag is FALSE. In this case, A[p]=A[0] does not point to R-root. Hence, the procedure 500 performs step 506. Per step 506, a determination is made as to whether both START=FALSE, and $t_q$ is in a node B which is either A[0] or a sibling of A[0]. In this case, START=FALSE and $t_2$="d" is in node (8) which is a sibling node of the node (6). Hence, node B is node (8), and the procedure 500 performs step 506a. Per step 506a, a determination is made as to whether node B is marked as a whole keyword. In this case, node (8) is marked as a whole keyword. Hence, the data pair of <KID=3, P=2> is added into the keyword occurrence set S, and the keyword occurrence counter K is incremented by one such that K=1. The procedure 500 then goes on to step 506b. Per step 506b, a determination is made as to whether node B has a child node. In this case, node (8) has no child node, so, per step 506b, the array element A[0] is set to R-root. In other words, the value in A[0] is changed from 6 to 0. These changes to A[0], S, and K are shown in row 13. The procedure 500 then goes to step 508. Per step 508, the counter p is incremented by one so that p=1, and a determination is made as to whether p is less than M=4. In this case, p is less than M. As such, the procedure 500 loops back and performs step 505.

At this point in the procedure 500, q=2, p=1, START=FALSE, A[0]=0, A[1]=2, A[2]=0, A[3]=0, S={<KID=3, P=2>}, and K=1. This state corresponds to the initial state in row 14. Per step 505, a determination is made as to whether both the array element A[p] points to R-root, and the START flag is FALSE. In this case, A[p]=A[1] points to node (2), not R-root. Hence, the procedure 500 performs step 506. Per step 506, a determination is made as to whether both START=FALSE, and $t_q$ is in a node B which is either A[1] or a sibling of A[1]. In this case, START=FALSE, but $t_2$="d" is in neither node (2) nor any sibling of node (2). Hence, the procedure 500 then goes on to step 507. Per step 507, A[1] is set to 0 (R-root). In other words, the value in A[1] is changed from 2 to 0. This change to A[1] is shown in row 14. The procedure 500 then goes to step 508. Per step 508, the counter p is incremented by one so that p=2, and a determination is made as to whether p is less than M=4. In this case, p is less than M. As such, the procedure 500 loops back and performs step 505.

At this point in the procedure 500, q=2, p=2, START=FALSE, A[0]=0, A[1]=0, A[2]=0, A[3]=0, S={<KID=3, P=2>}, and K=1. This state corresponds to the initial state in row 15. Per step 505, a determination is made as to whether both the array element A[p] points to R-root, and the START flag is FALSE. In this case, A[p]=A[2] points to node (0), which is R-root, and START=FALSE. Hence, the procedure 500 performs step 505a. Per step 505a, a determination is made as to whether there exists a sibling node B to R-root such that $t_q=t_2$="d" is in B and B has a child node. As seen in FIG. 4M, node (4) is a sibling node of R-root that contains "d", and node (5) is a child node of node (4). Hence, the array element A[2] is set to 5 so as to point to the child node (5), and the START flag is set to TRUE. These changes in A[2] and START are shown in row 15. The procedure 500 then goes to step 508. Per step 508, the counter p is incremented by one so that p=3, and a determination is made as to whether p is less than M=4. In this case, p is less than M. As such, the procedure 500 loops back and performs step 505.

At this point in the procedure 500, q=2, p=3, START=TRUE, A[0]=0, A[1]=0, A[2]=5, A[3]=0, S={<KID=3, P=2>}, and K=1. This state corresponds to the state in row 16. Per step 505, a determination is made as to whether both the array element A[p] points to R-root, and the START flag is FALSE. Because START=TRUE, the procedure 500 goes through steps 505, 506, and 507 in a similar manner as discussed above in relation to row 6. The procedure 500 then goes to step 508. Per step 508, the counter p is incremented by one so that p=4, and a determination is made as to whether p is less than M=4. In this case, p=M, so the procedure 500 goes to step 509. At step 509, the counter q is decremented by one such that q=1, and a determination is made as to whether q>0. In this case, q=1>0, so the procedure 500 loops back to step 504. At step 504, the counter p is reset to zero, and the START flag is reset to FALSE. The procedure 500 then goes to step 505.

At this point in the procedure 500, q=1, p=0, START=FALSE, A[0]=0, A[1]=0, A[2]=5, A[3]=0, S={<KID=3, P=2>}, and K=1. This state corresponds to the state in row 17. Per step 505, a determination is made as to whether both the array element A[p] points to R-root, and the START flag is FALSE. In this case, A[p]=A[0] points to node (0), which is R-root, and START=FALSE. Hence, the procedure 500 performs step 505a. Per step 505a, a determination is made as to whether there exists a sibling node B to R-root such that $t_q=t_1$="b" is in B and B has a child node. As seen in FIG. 4M, there is no sibling node to R-root that contains "b". Hence, the procedure 500 then goes to step 508. Per step 508, the counter p is incremented by one so that p=1, and a determination is made as to whether p is less than M=4. In this case, p is less than M. As such, the procedure 500 loops back and performs step 505.

At this point in the procedure 500, q=1, p=1, START=FALSE, A[0]=0, A[1]=0, A[2]=5, A[3]=0, S={<KID=3, P=2>}, and K=1. This state corresponds to the initial state in row 18. Per step 505, a determination is made as to whether both the array element A[p] points to R-root, and the START flag is FALSE. In this case, A[p]=A[1] points to node (0), which is R-root, and START=FALSE. Hence, the procedure 500 performs step 505a. Per step 505a, a determination is made as to whether there exists a sibling node B to R-root such that $t_q$="b" is in B and B has a child node. As seen in FIG. 4M, there is no sibling node to R-root that contains "b". Hence, the procedure 500 then goes to step 508. Per step 508, the counter p is incremented by one so that p=2, and a determination is made as to whether p is less than M=4. In this case, p is less than M. As such, the procedure 500 loops back and performs step 505.

At this point in the procedure 500, q=1, p=2, START=FALSE, A[0]=0, A[1]=0, A[2]=5, A[3]=0, S={<KID=3, P=2>}, and K=1. This state corresponds to the initial state in row 19. Per step 505, a determination is made as to whether both the array element A[p] points to R-root, and the START flag is FALSE. In this case, A[p]=A[2] points to node (5), not R-root. Hence, the procedure 500 performs step 506. Per step 506, a determination is made as to whether both START=FALSE, and $t_q$ is in a node B which is either A[2] or a sibling of A[2]. In this case, START=FALSE, but $t_1$="b" is in neither node (5) nor any sibling of node (5). Hence, the procedure 500 then goes on to step 507. Per step 507, A[2] is set to 0 (R-root). In other words, the value in A[1] is changed from 5 to 0. This change to A[2] is shown in row 14. The procedure 500 then goes to step 508. Per step 508, the counter p is incremented by one so that p=3, and a determination is made as to whether p is less than M=4. In this case, p is less than M. As such, the procedure 500 loops back and performs step 505.

At this point in the procedure 500, q=1, p=3, START=FALSE, A[0]=0, A[1]=0, A[2]=0, A[3]=0, S={<KID=3, P=2>}, and K=1. This state corresponds to the initial state in row 20. Per step 505, a determination is made as to whether both the array element A[p] points to R-root, and the START flag is FALSE. In this case, A[p]=A[3] points to node (0), which is R-root, and START=FALSE. Hence, the procedure 500 performs step 505*a*. Per step 505*a*, a determination is made as to whether there exists a sibling node B to R-root such that $t_q$=$t_1$="b" is in B and B has a child node. As seen in FIG. 4M, there is no sibling node to R-root that contains "b". Hence, the procedure 500 then goes to step 508. Per step 508, the counter p is incremented by one so that p=4, and a determination is made as to whether p is less than M=4. In this case, p=M, so the procedure 500 goes to step 509. At step 509, the counter q is decremented by one such that q=0, and a determination is made as to whether q>0.

In this case, since q=0, the procedure 500 goes to step 510. At step 510, the procedure 500 returns the keyword occurrence counter K and the keyword occurrence set S.

Performance Results

Applicants have determined that the above-described RTMM procedure provides superior performance when the keyword dictionary is large while the keyword length is short. In particular, a large keyword dictionary may have 10,000 keywords or more, and the dictionary may include short keywords which are three or four bytes long. For example, the keyword dictionary may include several thousand names and may include short names that are a few bytes in length.

Table 4 below compares the performance of the RTMM procedure against the performance of the BMH procedure. The performance is shown in terms of the number of seconds (s) to finish the matching procedure for a given text size and various numbers of short keywords in the KW-S (ranging from 1 keyword to 1,000,000 keywords).

TABLE 4

| Pro-cedure | Text size | Number of keywords in KW-S | | | | | | |
|---|---|---|---|---|---|---|---|---|
| | | 1 | 50 | 500 | 5000 | 50,000 | 500,000 | 1,000,000 |
| BMH | 15 MB | 0 s | 1 s | 13 s | 137 s | 1379 s | Did not finish | Did not finish |
| RTMM | 15 MB | 0 s | 0 s | 0 s | 0 s | 0 s | 1 s | 2 s |
| RTMM | 58 MB | 0 s | 1 s | 1 s | 2 s | 3 s | 5 s | 6 s |

In Table 4, "Did not finish" means that the procedure took too long a time such that the match procedure was not finished. As seen above, while the BMH procedure finishes rapidly for small dictionaries, it does not scale well and takes a proportionally longer time to finish as the dictionary gets larger. In comparison, the RTMM procedure finishes much more rapidly, especially for larger dictionary sizes.

Computer Apparatus

Figure 6:
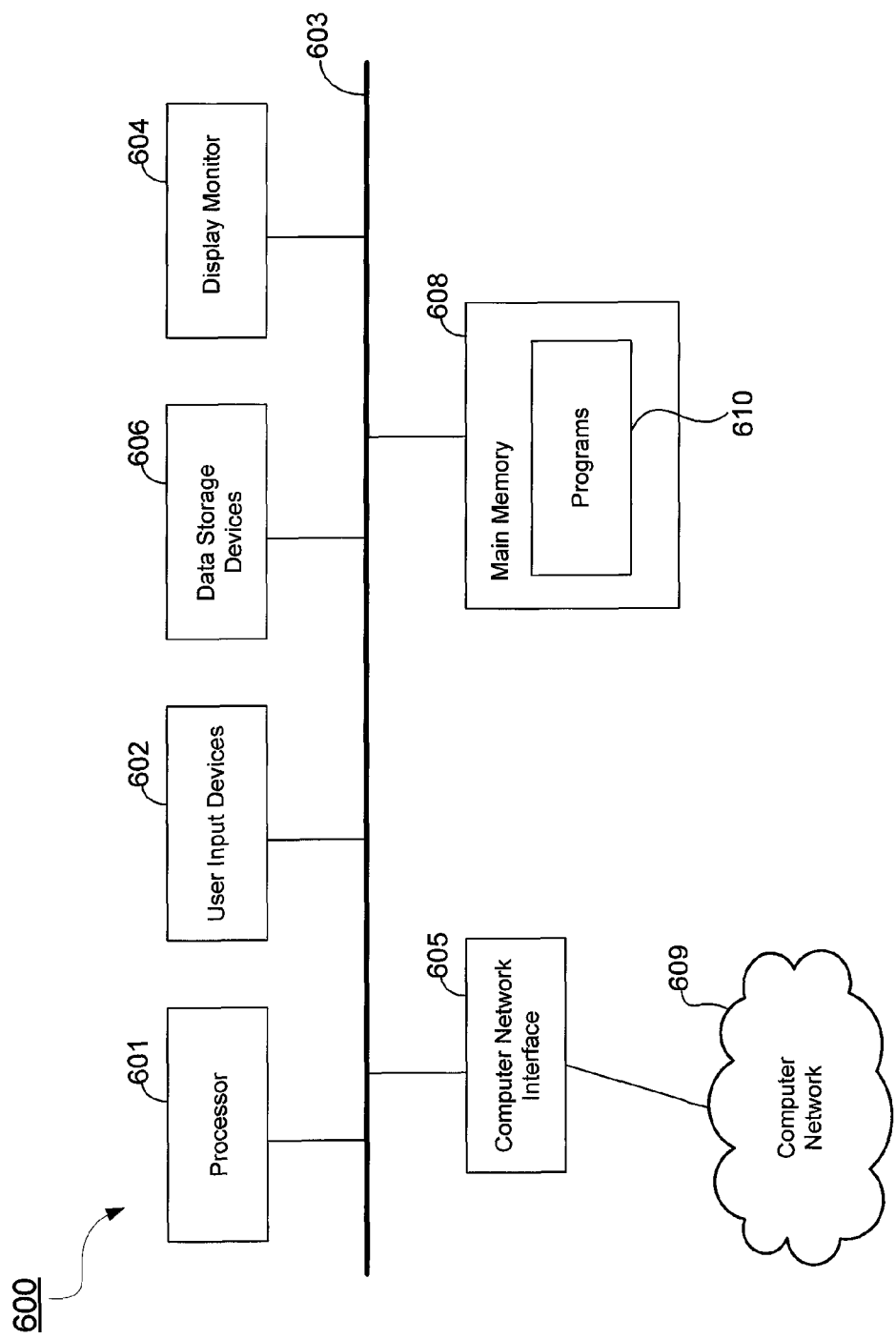
FIG. 6 is a schematic diagram of an example computer that may be used in embodiments of the present invention.

Referring to FIG. 6, there is shown a schematic diagram of an example computer apparatus that may be used in embodiments of the present invention. As shown in the figure, the computer may include a processor 601, such as those from the Intel Corporation or Advanced Micro Devices, for example. The computer may have one or more buses 603 coupling its various components. The computer may include one or more input devices 602 (e.g., keyboard, mouse, etc.), a display monitor 604 (e.g., LCD, cathode ray tube, flat panel display, etc.), a computer network or communications interface 605

TABLE 3

| Row | q | p | START | A | A[1] | A[2] | A[3] | S | K |
|---|---|---|---|---|---|---|---|---|---|
| 1 | 5 ("e") | 0 | False | 0 | 0 | 0 | 0 | Empty | 0 |
| 2 | 5 ("e") | 1 | False | 0 | 0 | 0 | 0 | Empty | 0 |
| 3 | 5 ("e") | 2 | False | 0 | 0 | 0 | 0 | Empty | 0 |
| 4 | 5 ("e") | 3 | False | 0 | 0 | 0 | 0 | Empty | 0 |
| 5 | 4 ("d") | 0 | False → True | 0 → 5 | 0 | 0 | 0 | Empty | 0 |
| 6 | 4 ("d") | 1 | True | 5 | 0 | 0 | 0 | Empty | 0 |
| 7 | 4 ("d") | 2 | True | 5 | 0 | 0 | 0 | Empty | 0 |
| 8 | 4 ("d") | 3 | True | 5 | 0 | 0 | 0 | Empty | 0 |
| 9 | 3 ("c") | 0 | False | 5 → 6 | 0 | 0 | 0 | Empty | 0 |
| 10 | 3 ("c") | 1 | False → True | 6 | 0 → 2 | 0 | 0 | Empty | 0 |
| 11 | 3 ("c") | 2 | True | 6 | 2 | 0 | 0 | Empty | 0 |
| 12 | 3 ("c") | 3 | True | 6 | 2 | 0 | 0 | Empty | 0 |
| 13 | 2 ("d") | 0 | False | 6 → 0 | 2 | 0 | 0 | Empty → <KID = 3, P = 2> | 1 |
| 14 | 2 ("d") | 1 | False | 0 | 2 → 0 | 0 | 0 | <KID = 3, P = 2> | 1 |
| 15 | 2 ("d") | 2 | False → True | 0 | 0 | 0 → 5 | 0 | <KID = 3, P = 2> | 1 |
| 16 | 2 ("d") | 3 | True | 0 | 0 | 5 | 0 | <KID = 3, P = 2> | 1 |
| 17 | 1 ("b") | 0 | False | 0 | 0 | 5 | 0 | <KID = 3, P = 2> | 1 |
| 18 | 1 ("b") | 1 | False | 0 | 0 | 5 | 0 | <KID = 3, P = 2> | 1 |
| 19 | 1 ("b") | 2 | False | 0 | 0 | 5 → 0 | 0 | <KID = 3, P = 2> | 1 |
| 20 | 1 ("b") | 3 | False | 0 | 0 | 0 | 0 | <KID = 3, P = 2> | 1 |

(e.g., network adapters, wireless network adapters, etc.) for communicating over a computer (data) network 609, one or more data storage devices 606 (e.g., hard disk drive, optical drive, FLASH memory, etc.) for storing computer-readable data onto computer-readable media and for reading the data therefrom, and a main memory 608 (e.g., DRAM, SRAM, etc.).

Computer-readable data (including computer-readable program instructions) may be stored in the data storage devices 606 and may be loaded into main memory 608. Computer-readable data may also be received over the computer network 609 by way of a communications interface 605. In particular, the main memory 608 may loaded with programs 610 (comprising computer-readable instruction code and data) which may be executed by the processor 601 to perform some of the functionalities and operations as described herein.

What is claimed is:

1. A computer-implemented method for multiple-keyword matching performed using a computer including at least a processor, data storage, and computer-readable instructions, and the computer-implemented method comprising:
    obtaining a keyword set;
    dividing the keyword set into a first subset of shorter keywords and a second subset of longer keywords;
    applying a first keyword search procedure using the first keyword subset in in response to a determination that a number of keywords in the first keyword subset is less than a threshold number;
    applying a second keyword search procedure in response to a determination that the number of keywords in the first keyword subset is greater than or equal to the threshold number, wherein the second keyword search procedure comprises applying a reverse-trie based multiple-short-keyword matching procedure;
    applying the first keyword search procedure using the second keyword subset in response to a determination that a number of keywords in the second keyword subset is less than the threshold number; and
    applying a third keyword search procedure using the second keyword subset in response to a determination that a number of keywords in the second keyword subset is greater than or equal to the threshold number.

2. The computer-implemented method of claim 1, wherein the first keyword search procedure comprises iteratively applying a Boyer-Moore-Horspool procedure for single-keyword matching.

3. The computer-implemented method of claim 1, wherein the third keyword search procedure comprises a Karp-Rabin type procedure.

4. The computer-implemented method of claim 1, wherein a threshold length is used to divide the keyword set into the first and second subsets, and wherein the threshold length is ten characters or less.

* * * * *